Sept. 25, 1956  D. G. BROSCOMB ET AL  2,764,351
MACHINES FOR DELIVERING PREDETERMINED QUANTITIES OF ARTICLES
Filed Aug. 5, 1952  5 Sheets-Sheet 1
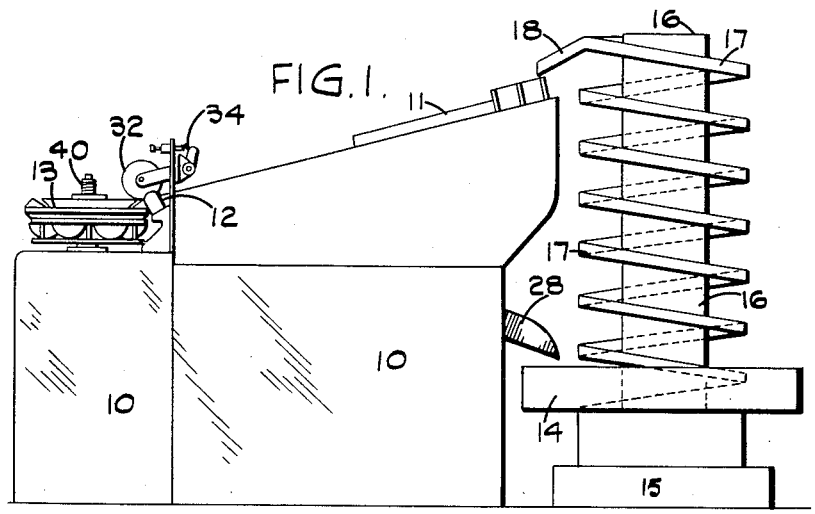
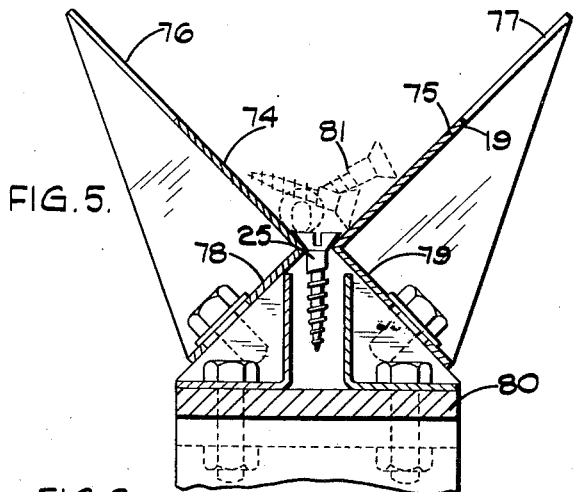
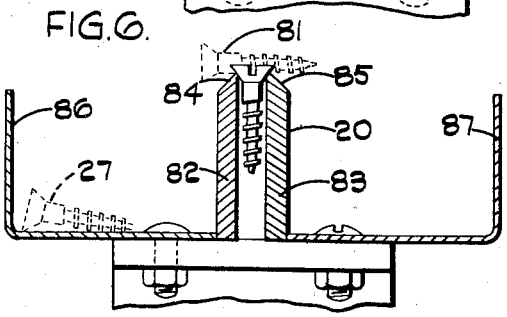
INVENTORS:
Dennis George Broscomb,
Arthur Henry Hawkins,
Samuel Horace Ellens.
BY
Richardson, David and Vordon
THEIR AGENTS.

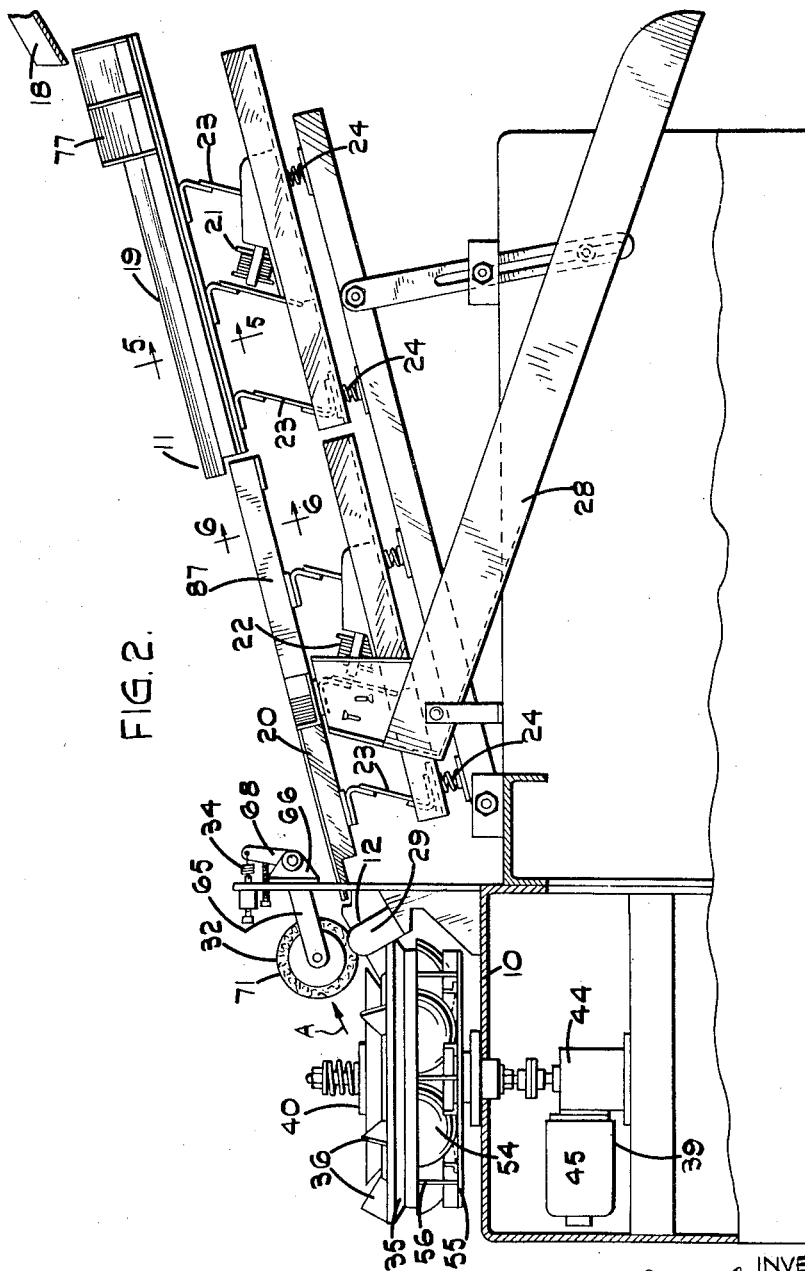

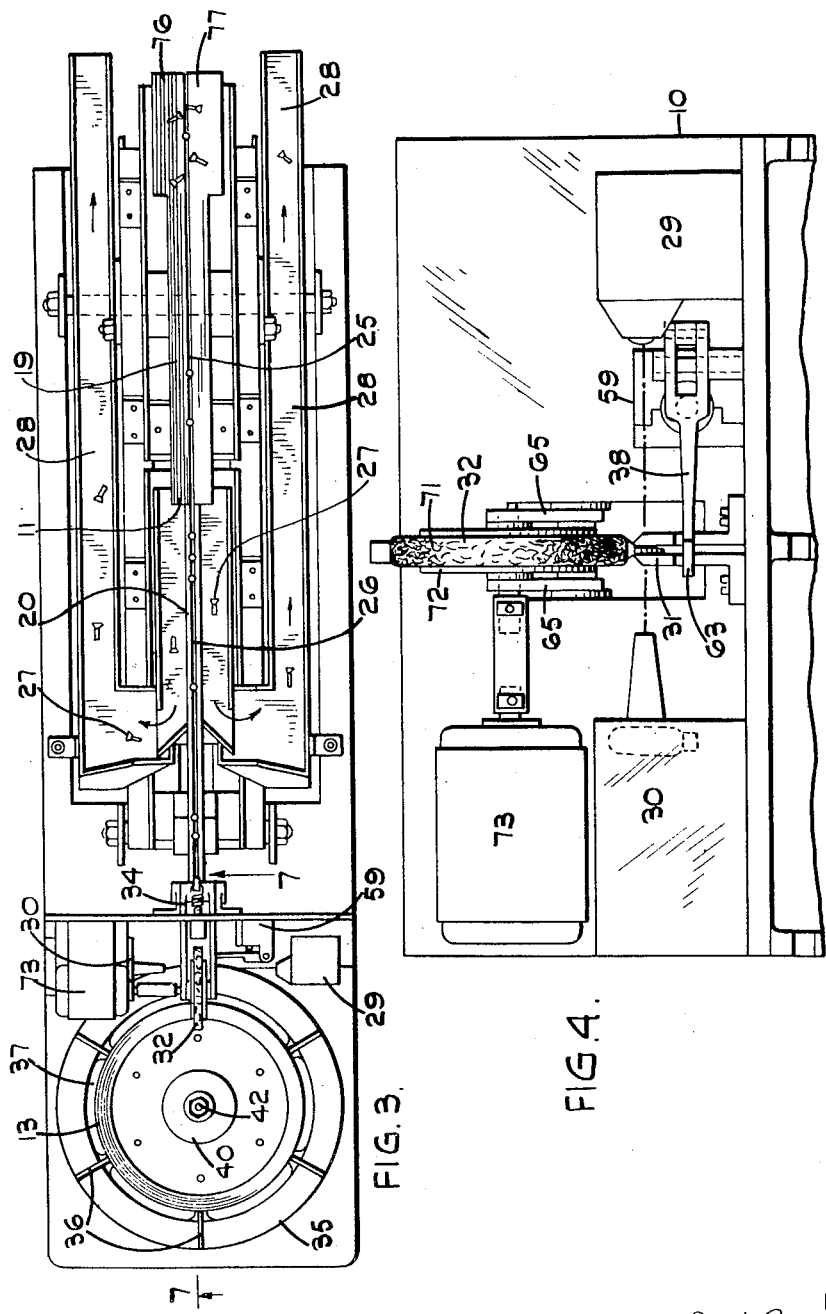

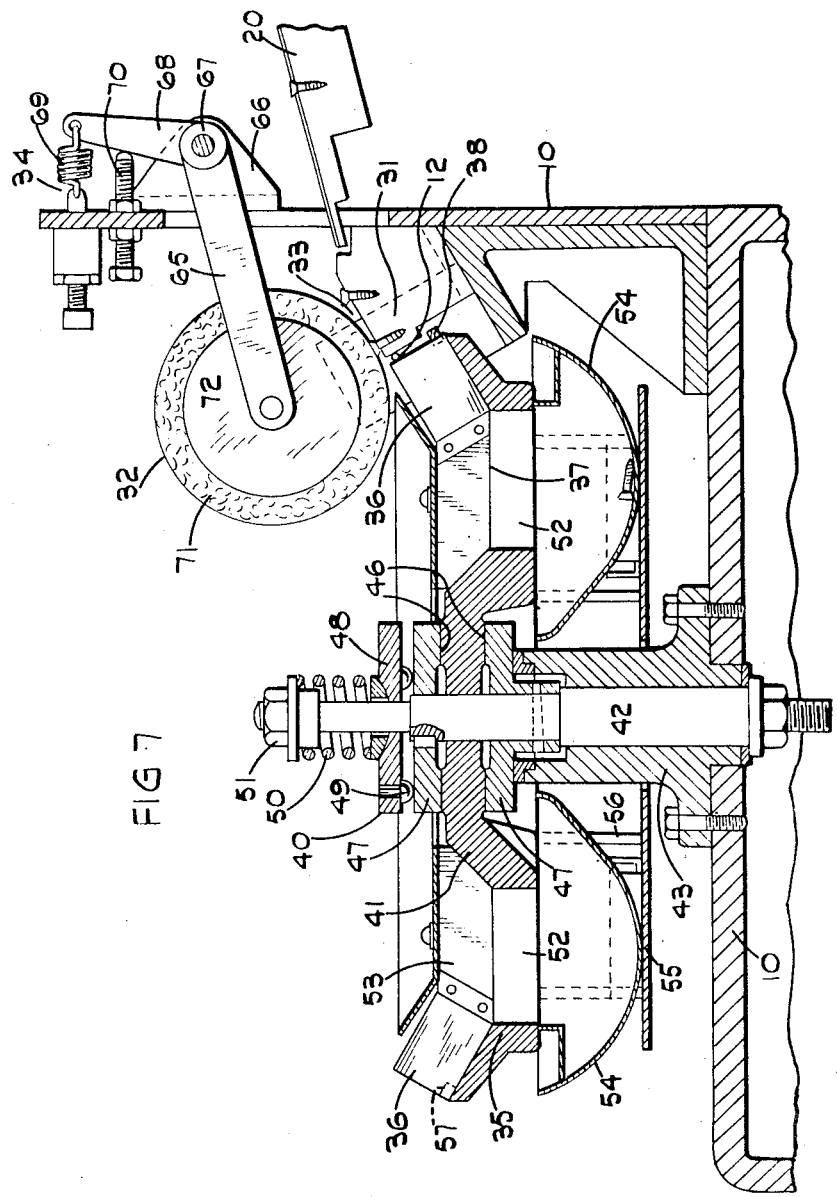

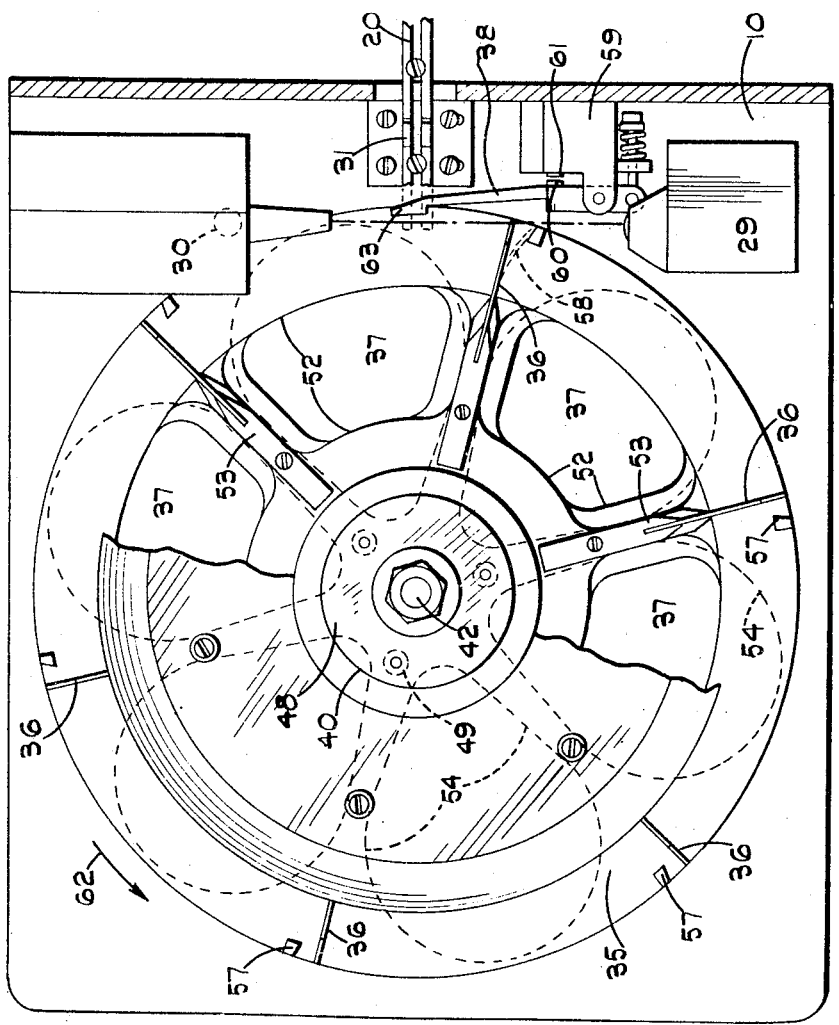

__United States Patent Office__

2,764,351
Patented Sept. 25, 1956

2,764,351
MACHINES FOR DELIVERING PREDETERMINED QUANTITIES OF ARTICLES

Dennis George Broscomb, Weybridge, Arthur Henry Hawkins, Quinton, Birmingham, and Samuel Horace Ellens, Palfrey, Walsall, England, assignors to G. K. N. Group Services Limited, Smethwick, England, a British company Application August 5, 1952, Serial No. 302,644

Claims priority, application Great Britain August 15, 1951

8 Claims. (Cl. 235—132)

The present invention relates to a new or improved machine, hereinafter referred to as a "batching machine," for delivering predetermined numerical quantities of articles.

The machine is especially although not exclusively applicable to the batching of relatively small articles such as screws, bolts and nuts which are ordinarily sold by number rather than by weight, but it is to be understood that the invention, the scope of which is defined in the claims, is not limited to this application.

More particularly one of the objects of the invention is to provide new or improved means whereby at least the last article in one batch and the first article in the next batch may be separated from each other with a high degree of certainty.

A further object is to provide means of this kind which are simple and reliable in operation and do not involve high costs in their manufacture.

Yet another object is to provide for approximate batching of the articles by the provision of a receiving member having a plurality of receiving stations, this member being displaceable relatively to the delivery path of the articles to register said stations successively therewith, and to combine with such arrangement new or improved means directed primarily to the separation of at least the last and first articles of successive batches to attain accurate batching.

A further object of the invention is to provide new or improved means for presenting the articles to detection means at a counting station in such manner that miscounting is avoided or reduced.

More specifically such new or improved means are directed firstly to providing separation between successive articles great enough to allow the detection device to "recover" from the preceding count before a new counting stimulus is applied thereto.

Further, a specific object of these new or improved means is to orientate or position the articles in a particular or predetermined manner relatively to the detection device and relatively to accurate batching separation means.

Yet another object of the invention is to provide new or improved feeding means in combination with the foregoing device, so as to obtain from a bulk supply of articles an orderly progression of the articles one behind the other along a feed path, the risk of sticking or obstruction being obviated or reduced to a low order.

Other objects and advantages of the invention will appear or will be specifically pointed out in the following description of a preferred embodiment thereof given with reference to the accompanying drawings, in which:

Figure 1 shows in side elevation a general view of one construction of batching machine in accordance with the present invention;

Figure 2 is a further view of the same construction in side elevation on an enlarged scale and with the cover plates of the machine removed;

Figure 3 is a plan view of the machine as shown in Figure 2;

Figure 4 is a view in end elevation looking in the direction of the arrow "A" of Figure 2, this view being shown on an enlarged scale;

Figure 5 is a cross-sectional view on an enlarged scale on the line 5—5 of Figure 2 showing a cross section of the primary guideway structure;

Figure 6 is a similar view taken on the line 6—6 of Figure 2 and showing a cross section of the secondary guideway structure;

Figure 7 is a cross-sectional view in side elevation of the receiving member showing the arrangement of this in relation to the control wheel, this view being taken on the line 7—7 of Figure 3; and Figure 8 is a plan view of the part shown in Figure 7 omitting the control wheel.

The machine illustrated in the drawings is intended primarily for batching screws or other similarly shaped articles of rod-like form having a shank and a head, and in the following description for the sake of convenience the articles concerned will be referred to as "screws," but it is to be understood that the invention is not limited to the batching of such articles since the machine is capable of being operated successfully in substantially the same manner with a variety of articles including nuts, washers and other elements or components of fastening devices with only comparatively minor modifications such as would be capable of being made by a skilled engineer having regard to the following disclosure.

The machine illustrated comprises any suitable form of supporting structure or frame, indicated generally at 10, one part of such structure serving to support feeding means 11 for delivering screws in an orderly row one behind the other through a counting station 12 to batch-separating means, indicated generally at 13, supported on a further part of the structure 10.

The screws are supplied to the receiving end of the feeding means 11 by any suitable form of conveyor device, itself charged with screws from a bulk supply. For example this device may comprise a flanged circular trough or tray 14 mounted on a base 15 and from which extends upwardly a column 16 about which is arranged a spiral or helical conveyor 17 to which is imparted vibratory arcuate and axial displacements with reference to the axis of the column 16 in such a manner that a supply of screws from the trough or tray 14 travels up the conveyor 17 and is discharged from its delivery end 18 onto the receiving end of the feeding means 11. This form of conveyor is of known type and no novelty is claimed therein.

The feeding means 11 itself comprises a primary guideway structure 19 and a secondary guideway structure 20 which are inclined downwardly, as illustrated, and with which are operatively connected vibrator devices 21 and 22 for imparting endwise vibrations to the structures, the latter being resiliently supported by means of a series of leaf springs, such as indicated at 23, and coil springs 24. The primary guideway structure has side members extending upwardly and divergently from each other, as viewed in cross section, their lower adjacent edge portions defining a trackway 25 (Figure 3) for the screws, and the secondary guideway structure has side members defining a continuation 26 of said trackway and presenting at each side thereof shedding faces for surplus screws, such as those indicated at 27, which are returned by the chute or conveyor means 28 back to the bulk supply trough or tray 14.

The delivery end of the secondary guideway structure discharges through a counting station, indicated generally at 12 (Figures 1, 2 and 7), at which is situated a counting or detection device, which may be in the form of a photoelectric cell assembly comprising a lamp 29 and photo cell unit 30 (Figure 3).

Immediately in advance of the counting station having regard to the direction of progression of the screws the delivery end of the secondary guideway structure terminates in a guide passageway for orientating screws in a predetermined direction in relation to the direction of progression. This passageway is defined by a track member 31 which supports the heads of the screws at their underfaces and a rotary control member in the form of a wheel 32 arranged in tangential or approximately tangential relation to the track member and thus presenting its circumferential or radially-directed face towards said track member, thus producing a convergent entrance 33 into which the heads of the screws pass.

This control wheel serves to accelerate the individual screws to ensure sufficient separation between them to avoid miscounting by the detection device.

The control wheel may be supported in any convenient manner, such as by the assembly indicated generally at 34.

At the delivery side of the counting station batch-separating means are provided, which in the particular construction illustrated comprise in combination a rotary-receiving member 35 and a plurality of deflector elements 36, which are in the form of resilient metal flaps. It will however be appreciated that although it is advantageous to mount the flaps on the receiving member, other arrangements may be adopted within the scope of the invention in which the deflector element or elements are supported separately from the receiving member.

The receiving member is formed to provide a plurality of receiving stations 37 in between the flaps 36, and the receiving member is arranged to be rotated intermittently to register successive receiving stations in the delivery path of screws from the counting station, thereby to effect an approximate batching. In combination with this arrangement the flaps 36 provide accurate batching by effecting relative lateral displacement between the last screw of one batch and the first screw of the next succeeding batch, and they are further utilised to coact with retention means, which may be in the form of a latch 38 operatively connected with the detection device and freed from each flap in succession in response to the passage through the counting station of the predetermined number of screws required in each batch.

The receiving member is driven rotatably by means, indicated generally at 39, through a slipping, yielding or lost-motion transmission device 40 which allows the retention device to hold the receiving member stationary for the requisite period while transmitting sufficient torque to stress the spring flaps 36 so that the latter are subjected to a potential deflecting force acting in the direction in which they are permitted to move relatively to the receiving member.

The flaps are supported cantilever fashion, their free ends being disposed radially outwards, and consequently the subjection of each flap to the potential deflecting force stores a certain amount of energy in the flaps which is liberated when the flap is released, causing same to move transversely through the delivery path of the screws at relatively high speed immediately on release of the flap so as to provide relative lateral displacement between the last screw or the last two or three screws of each batch and the first screw or the first two or three screws of the next succeeding batch.

In the particular construction illustrated in detail in Figure 7 the receiving member is in the form of a generally circular rotary plate 41 provided centrally with an aperture through which extends a driving spindle 42.

The driving spindle 42 is itself journalled in a sleeve bearing member 43 fixedly supported on the structure 10 and coupled through a gearbox 44 (Figure 2) to an electric driving motor 45 which is energised continuously, the spindle 42 thereby being rotated continuously.

The plate 41 forming the main part of the receiving member has a pair of facings 46 of annular form arranged concentrically with the aperture through which the spindle passes, and with these facings coact clutch plates 47 the lower one of which is pinned to the spindle 42 and the upper one of which is keyed to the spindle but is capable of sliding axially thereon.

Pressure is maintained between the facings and these clutch plates by means of a thrust plate 48 formed as a ball carrier and having on its underside balls 49 bearing on the upper clutch plate 47, a coiled compression spring 50 disposed on the upper part of the spindle 42 serving to exercise pressure on the thrust plate 48. This pressure may be adjusted by screwing down the securing nut 51 to a greater or less extent.

The plate 41 of the receiving member is formed with a plurality of angularly-spaced apertures 52 which are separated from each other by partitions 53 extending radially, to the outer ends of which are secured cantilever-wise the spring flaps 36. The latter are of spring steel or other resilient metal but they could be hinged to the plate 41 and acted upon by separate springs.

The spring flaps, partitions and apertures 52 define a plurality of receiving stations beneath which are disposed removable receptacles 54 for the screws, these receptacles themselves being supported on a sheet metal platform 55 suitably supported on the plate 41 by dependent brackets or members 56 the upper ends of which are secured to the under-faces of the main plate 41.

The limit of lateral deflection of the spring flaps is determined by the provision of stops or abutments 57 on the plate 41, these lying on the trailing side of their respectively associated flaps. Figure 8 shows in broken lines at 58 the configuration assumed by the spring flap when subjected to the potential deflecting force arising from torque transmitted through the clutch and while the flap is acted on by the latch member 38 of the retention device.

The retention device as illustrated comprises the latch member 38 which is pivotally supported by means of the fixed portion of a solenoid assembly 59, the latch member carrying an armature 60 which is attracted towards the core of the solenoid at 61 in response to a suitably amplified electrical impulse transmitted from the photo cell unit 30 during the passage through the counting station of the last screw of each batch. It will be understood that the photocell unit 30 embodies a thermionic tube circuit adapted to produce an electrical impulse in response to a predetermined number of interruptions of the photocell light beam. The specific details of the circuit do not constitute part of the present invention and are not shown. A suitable form of circuit is one of the foregoing type manufactured by G. K. N. Group Services Limited of London Works, Smethwick, in the county of Stafford, England.

As a consequence of this the spring flap 36 previously retained by the latch member 38 is allowed to return to its unstressed condition so as to deflect the last screw, or possibly the last two or three, in the anticlockwise direction of rotation of the receiving member, as indicated by the arrow 62.

The extension or head 63 of the latch member prevents this re-latching with the stops 57 during rotation of the receiving member, which is performed subsequently to the release of each flap.

In the specific construction and arrangement of screw separating and orientation control means illustrated the latter is in the form of a rotary element or wheel, the circumferential or radially-presented face of which in effect forms a movable wall of the guide passageway hereinbefore referred to.

This wheel is journalled in bearings formed in the ends of lever arms 65, the other ends of which are pivotally supported by a bracket 66 attached to part of the structure 10, the lever arms 65 having an integral boss 67 from which extends a further arm 68 between which and the fixed structure 10 is connected a tension spring 69 so as to draw the whole pivotal mounting structure for the control wheel against an adjustable stop 70.

Adjustment of this stop enables the clearance between the bed or upper surface of the track member 31 and the circumferential face of the control wheel 32 to be precisely controlled and is so adjusted that this clearance is slightly less than the depth presented by the heads of the screws.

The control wheel is formed or has a peripheral portion which is formed of resilient or yieldable material. For example the control wheel may be formed of a cylindrical felt pad 71 which is clamped between side plates 72, and the heads of the screws thus form slight indentations in the circumferential face of this pad, whereby they are positively accelerated up to the peripheral velocity of the wheel.

Each screw is expelled from the end of the track member 31 and passes through the counting station with a separation or spacing from the next succeeding screw which depends upon the peripheral speed of the control wheel, but which is at least equal to the shank diameter.

The absolute value of the speed of delivery of the screws to the control wheel and the speed of delivery from the control wheel may be varied widely, depending upon size and characteristics of shape of the screws, as well as their weight, but in general an increase of speed anywhere in the range 5 to 15 times will produce satisfactory spacing of the screws and will avoid miscounting by the detection device.

For example screws may be fed to the track member 31 at about 10 to 18 gross per minute, and satisfactory results are achieved utilising a 6-inch diameter control wheel of felt construction when rotating this at about 280 R. P. M., thus providing an increase in speed of about 10 times. The wheel is driven in any suitable manner, for example by direct coupling to its own electric motor 73.

An important advantage of utilising the control wheel in the manner described is that the screws are oriented in a predetermined direction such as to avoid miscounting, and also such that their shanks lie parallel to the plane of the separating flap which is registered with the delivery path of the screws. This avoids uncertainty as to the manner in which the last screw of a batch will be acted upon by the separating flap when the latter is released and ensures that it will be delivered to the same receiving station as the preceding screws of the same batch.

In the particular construction illustrated the subdivision of the feeding means into a primary guideway structure 19 and a secondary guideway structure 20 is intended to ensure the delivery through the counting station of the screws arranged in an orderly row without surplus screws arranged otherwise tending to interfere with the proper operation of the various devices situated at the counting station.

To this end, preliminary arrangement of the screws so that at least some of them achieve row formation is effected in the primary guideway structure 19, which has side members 74 and 75 which diverge from each other laterally and upwardly as viewed in cross section and which are preferably arranged in V formation, as illustrated.

At the receiving end the side members may have portions of greater width, as seen at 76 and 77, and throughout their length their lower adjacent edge portions are separated by a slot 25 which forms a trackway supporting the heads of the screws while allowing their shanks to depend.

The side members 74 and 75 may be supported in any convenient manner; for instance they may be of angle section and secured by means of one of the limbs of this section, indicated at 78 and 79, to a base structure 80 which is itself supported on the spring blades 23.

As a result of progression down this primary guideway structure a proportion of the screws will be arranged in an orderly row while others of the screws will still lie transversely to the trackway, as illustrated in broken lines at 81.

These surplus screws are removed during progression down the secondary guideway structure, which in the particular construction illustrated has side members 82 and 83 defining a continuation of said slot or trackway, these members being arranged in spaced parallel vertical relationship, as illustrated. The upper edge faces 84 and 85 form sheds tending to discharge surplus screws 81 laterally, preferably these faces being arranged in inverted V formation as illustrated.

At each side of the shedding faces channel-like receptacles 86 and 87 are provided the lower ends of which have outlets which discharge laterally into the chute or conveyor 28 by means of which the surplus screws are returned to the bulk supply.

This feeding device is especially advantageous in conjunction with the screw separating and orientation control means as hereinbefore described, inasmuch as it provides automatically a row of screws in which all the screws are arranged in at least approximately like orientations so that they are acceptable to the said separating and orientation control means, and further there is definite elimination of severely misorientated screws such as would lead to clogging of said means.

What we claim then is:

1. A batching machine comprising a supporting structure, means for feeding articles in succession through a counting station, a receiving member having a plurality of receiving stations for said articles and movably supported by said structure, said stations being separated by resilient separator flaps mounted on said receiving member for bodily movement therewith but capable of limited elastic deflection parallel to the general direction of movement of said member, means for driving said receiving member, retention means coacting successively with said flaps to arrest the receiving member at positions in which its receiving stations register successively with the delivery path of said articles while the particular flap concerned is deflected elastically, and a detection device at said counting station operatively connected with said retention means and responsive to the passage of a predetermined number of articles through said counting station to release said retention means, whereby the retained flap is released and is caused to move transversely through the delivery path of the articles to provide relative lateral displacement between at least the last article of a batch and the first article of the next succeeding batch, and the receiving member is freed for continued movement by its driving means to register the succeeding receiving station with said delivery path.

2. A batching machine comprising a supporting structure, means for feeding articles in succession through a counting station, a rotary receiving member having a plurality of receiving stations for said articles spaced angularly about its axis of rotation, said stations being separated by resilient separator flaps mounted on said receiving member for bodily movement therewith but capable of limited elastic deflection parallel to the general direction of movement of said member, means for driving said receiving member operatively connected thereto through a slipping transmission device affording driving torque while slipping, retention means coacting successively with said flaps to arrest the receiving member at positions in which its receiving stations register successively with the delivery path of said articles while the particular flap concerned is deflected elastically, and a detection device at said counting station operatively connected with said retention means and responsive to the passage of a predetermined number of articles throughs aid counting station to release said retention means, whereby the retained flap is released and is caused to move transversely through the delivery path of the articles to provide relative lateral displacement between at least the last article of a batch and the first article of the next succeeding batch, and the receiving member is freed for continued movement by its driving means to register the succeeding receiving station with said delivery path.

3. A batching machine comprising, a supporting structure, means for feeding articles in succession through a counting station, a receiving member having a plurality of receiving stations for said articles and movably supported by said structure, means for driving said receiving member incrementally to present said receiving stations successively at the delivery side of said counting station, at least one deflector element movable transversely to the delivery path of said articles proceeding from the counting station, means for subjecting said deflector member to a deflecting force acting along the direction in which said deflector element is movable, and means coordinating movements of said receiving member and said deflector element comprising, a retention means for holding said deflector element against movement while subjected to said force, a detection device at said counting station responsive to the passage therethrough of a predetermined number of articles and operatively associated with said retention means and said drive means to release the former and cause the latter to impart an increment of movement to said receiving member, whereby said deflector element is caused to move instantaneously through said delivery path and provide displacement in a direction transverse to said path between at least the last article of a batch and the first article of the next succeeding batch thereby causing said batches to be delivered to respective receiving stations of said receiving member.

4. A batching machine comprising, a supporting structure, means for feeding articles in succession through a counting station, a receiving member having a plurality of receiving stations for said articles and movably supported by said structure, means for driving said receiving member incrementally to present said receiving stations successively at the delivery side of said counting station, at least one deflector element movable transversely to the delivery path of said articles proceeding from said counting station means subjecting said deflector element to a deflecting force acting along the direction in which said deflector element is movable and of relatively great magnitude compared with the inherent inertia of said deflector element, means coordinating the movement of said receiving member and said deflector element comprising, a retention means for holding said deflector element against movement while subjected to said force, a detection device at said counting station responsive to the passage therethrough of a predetermined number of articles and operatively associated with said retention means and said drive means to release the former and cause the latter to impart an increment of movement to said receiving member, whereby said deflector element is caused to move instantaneously through said delivery path and provide displacement in a direction transverse to said path between at least the last article of a batch and the first article of the next succeeding batch thereby causing said batches to be delivered to respective receiving stations of said receiving member.

5. A batching machine comprising, a supporting structure, means for feeding articles in succession through a counting station, a receiving member having a plurality of receiving stations for said articles and movably supported by said structure, means for driving said receiving member incrementally to present said receiving stations successively at the delivery side of said counting station, at least one deflector element comprising a resilient metal flap supported cantileverwise at one edge and movable in a direction transverse to its own plane and transverse to the delivery path of said articles proceeding from said counting station, means for subjecting said deflector element to a deflecting force producing an elastic deflection of said element in said direction, and means coordinating the movements of said receiving member and said deflector element comprising, a retention means for holding said deflector element against movement while subjected to said force, a detection device at said counting station responsive to the passage therethrough of a predetermined number of articles and operatively associated with said retention means and said drive means to release the former and cause the latter to impart an increment of movement to said receiving member, whereby said deflector element is caused to move instantaneously through said delivery path and provide displacement in a direction transverse to said path between at least the last article of a batch and the first article of the next succeeding batch thereby causing said batches to be delivered to respective receiving stations of said receiving member.

6. In a batching machine of the kind comprising a supporting structure, and batch separating means supported thereby at a position beyond a counting station; the provision in combination of a detection device at said counting station responsive to the passage of a predetermined number of articles through said counting station to actuate said batch separating means, a track member of dimensions to constrain the articles to pass singly along it, means for feeding said articles along said track member at one speed, and an accelerating and orientation control member having an article engaging face presented towards said track member to define in conjunction therewith a guide passageway situated immediately in advance of said counting station and of dimensions to maintain the articles in a predetermined orientation whilst engaged with said face, and means for driving said orientation and said control member so that said face moves continuously forwardly lengthwise of said track member at a second speed greater than the first said speed selected to produce acceleration of said articles and a spacing between an article at said counting station and the next succeeding article at least equal to the dimensions of these articles measured in the direction of their movement.

7. In a batching machine of the kind comprising a supporting structure, and batch supporting means supported thereby at a position beyond a counting station; the provision in combination of a detection device at said counting station responsive to the passage of a predetermined number of articles through said counting station to actuate said batch separating means, a track member of cross sectional shape and dimensions to receive articles in a single longitudinally extending row for progression along it towards said counting station, means for feeding said articles along said track member towards said counting station at one speed, a control wheel for accelerating and controlling the orientation of said articles supported for rotation with its axis extending transversely to said track member and its peripheral face opposed to the upwardly presented face of the track member in at least approximately tangential relation thereto and at a position immediately in advance of said counting station, means for rotating said wheel about its axis so that its peripheral face moves continuously at a second speed greater than the first said speed, said face being formed of resiliently yieldable material to engage with said articles and simultaneously press same on to said track member and accelerate same preparatory to passage through said counting station, said second speed being such as to produce a spacing between an article at said counting station and the next succeeding article at least equal to the dimensions of these articles measured in the directions of their progression.

8. In a batching machine for headed rod like articles of the kind comprising a supporting structure and batch separating means supported thereby at a position beyond a counting station; the provision in combination of a detection device on said counting station resposive to the passage of a predetermied number of articles through said counting station to actuate said batch separating means, a track member having a longitudinal gap allowing the shanks of said articles to depend while their heads are supported on the upwardly presented faces of said track member on opposite sides of said gap, said gap being of a width to constrain said articles to pass singly along the said track member in a row one behind the other, means for feeding said articles along said track member towards said counting station at one speed, a control wheel supported for rotation with its axis extending transversely to said track member and its peripheral face opposed to the upwardly presented face of the track member in at least approximately tangential relation thereto and at a position immediately in advance of said counting station, means for rotating said wheel about its axis so that its peripheral face moves continuously at a second speed greater than the first said speed, said face being formed of resiliently yieldable material to engage with said articles and simultaneously press same on to said track member and accelerate same preparatory to passage through said counting station, said second speed being such as to produce a spacing between an article at said counting station and the next succeeding article at least equal to the dimensions of these articles measured in the directions of their progression.

References Cited in the file of this patent

UNITED STATES PATENTS

| | | |
|---|---|---|
| 81,404 | Pierce | Aug. 25, 1868 |
| 1,096,641 | Phifer | May 12, 1914 |
| 2,052,840 | Nussbaum | Sept. 1, 1936 |
| 2,256,327 | Parkes et al. | Sept. 16, 1941 |
| 2,417,074 | Green | Mar. 11, 1947 |
| 2,518,868 | Cookson | Aug. 15, 1950 |
| 2,523,517 | Potter | Sept. 26, 1950 |
| 2,528,196 | Von Till et al. | Oct. 31, 1950 |
| 2,594,337 | Noe | Apr. 29, 1952 |